Aug. 3, 1937.      D. GREGG      2,088,954
SUPERCHARGER REGULATOR
Filed Dec. 20, 1933
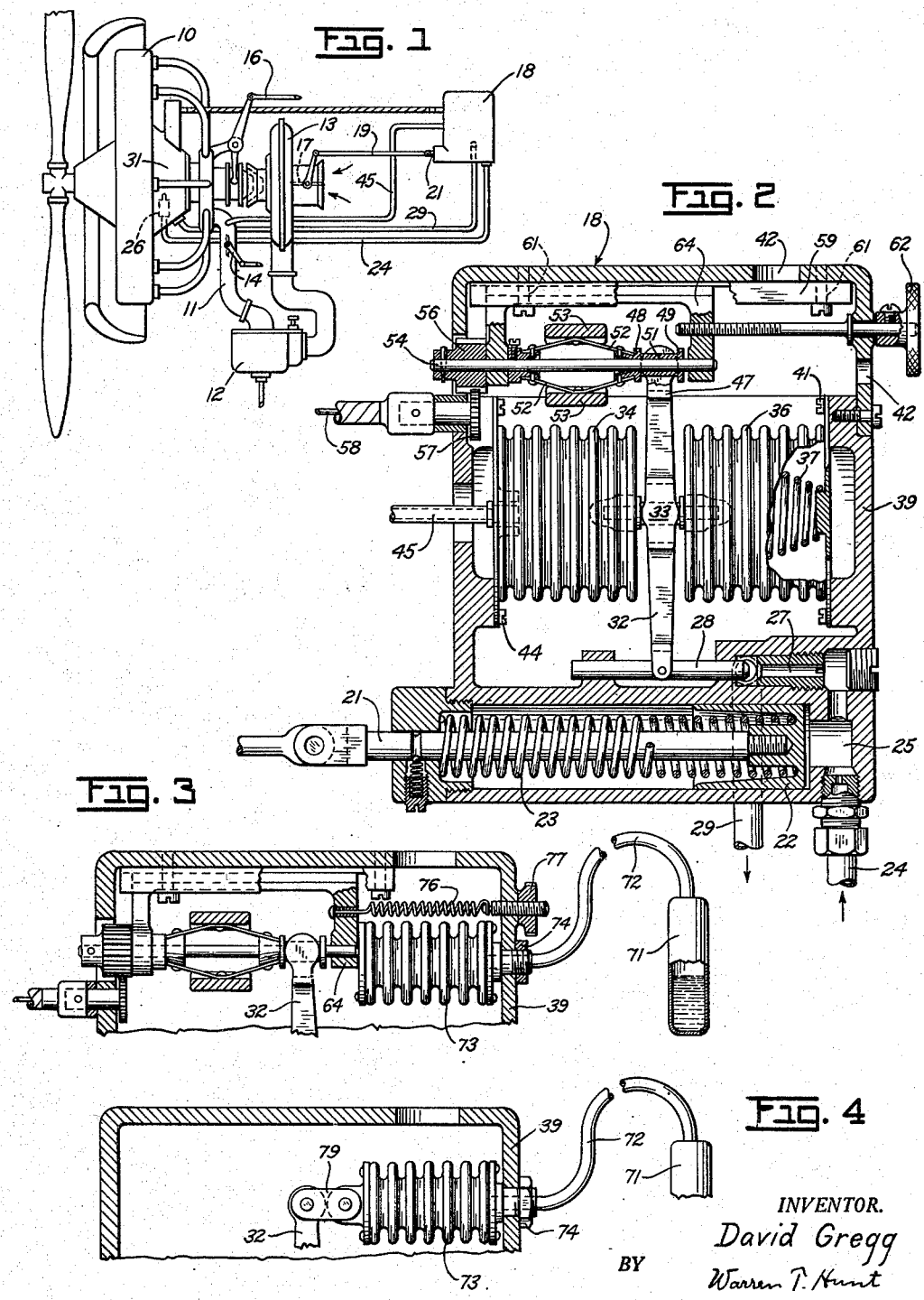
INVENTOR.
David Gregg
BY Warren T. Hunt
ATTORNEY.

Patented Aug. 3, 1937

2,088,954

UNITED STATES PATENT OFFICE 2,088,954

SUPERCHARGER REGULATOR

David Gregg, Caldwell, N. J., assignor to Eclipse Aviation Corporation, East Orange, N. J., a corporation of New Jersey Application December 20, 1933, Serial No. 703,265

17 Claims. (Cl. 123—119)

This invention relates to control mechanisms and more particularly to a fluid pressure actuated control mechanism or regulator suitable for use in connection with an internal combustion engine accessory such as a supercharger.

An object of the invention is to provide a regulator for controlling a supercharger or the like in accordance with the combined action of a number of variables.

Another object of the invention is to provide a regulator for an engine accessory which operates in accordance with the combined action of engine pressure and at least one other engine variable.

Another object of the invention is to provide a regulator for an engine accessory which operates in accordance with engine pressure and engine speed.

Another object of the invention is to provide a regulator for an engine accessory which is operated by a differential pressure mechanism, the action of which is modified by variables such as temperature and engine speed.

Another object of the invention is to provide a regulator which operates in accordance with a number of variables and in which the relation of the various elements may be readily changed by a manual operation for adjusting the regulator.

Other objects and features of the invention will be apparent from the following description in connection with which certain embodiments of the invention have been illustrated in the accompanying drawing in which:

Fig. 1 is a diagrammatic view illustrating the connection of the regulator with an engine and a supercharger;

Fig. 2 is an enlarged sectional view of a preferred form of the regulator;

Fig. 3 is a fragmental sectional view illustrating another form of the invention; and Fig. 4 is a fragmental sectional view illustrating a further form of the invention.

Referring to the drawing, 10 is an engine having an intake manifold 11, a carburetor 12, and a supercharger 13. A carburetor throttle control 14 is provided for controlling the quantity of mixture supplied to the engine and a manual control 16 is provided for connecting and disconnecting the supercharger 13 from the engine. The control of the supercharger 13 is effected by a throttle valve 17 connected to the regulator 18 by a rod 19, the arrangement being such that when the movable member 21 of the regulator is forced toward the left, as viewed in Figs. 1 and 2, the throttle valve 17 will be moved to the closed position and reduce the supercharging action. The internal construction of the regulator 18 is best shown in Fig. 2 and comprises a servomotor having a piston 22 normally urged toward the right by spring 23 and adapted to be moved toward the left by fluid pressure of the oil or other suitable fluid which enters the chamber 25 by means of conduit 24 connected to an engine driven pump diagrammatically shown at 26. The fluid from pump 26 normally flows through chamber 25 and conduit 27 past relief valve 28 to conduit 29 from which it returns to the engine crankcase 31 to be re-circulated by pump 26. Relief valve 28 is adapted to be moved by lever 32 having its mid-portion 33 in contact with the ends of expansible members or bellows 34 and 36 which are preferably formed of resilient material in order to expand and contract under the influence of pressure, but if preferred, each of the expansible members may be provided with a spring 37 adapted to expand the members and supplement the inherent flexibility of the bellows. Bellows 36 is preferably sealed under vacuum and secured to casing 39 by screws 41, casing 39 being provided with an opening 42 whereby atmospheric pressure may enter the casing and be impressed upon the exterior of each of the bellows. Bellows 34 is secured to casing 39 by screws 44 and has its interior connected to manifold 11 by a conduit 45 at a point between the throttle 14 and the engine whereby the bellows may be contracted and expanded in accordance with the differential between engine and atmospheric pressures. Bellows 34 and 36 are preferably in contact with lever 32 at all times whereby the mid-portion 33 may be moved to the right or left by the combined action of the two bellows. The upper end 47 of lever 32 is mounted between flanges 48 and 49 of sleeve 51 which is connected by springs 52 with centrifugal weights 53. Shaft 54 to which weights 53 are secured is driven by the engine through gear 56, gear 57 and flexible shaft 58. Gear 56 and the associated driven parts comprise the centrifugal mechanism which is bodily slidable with relation to housing 39 by means of guides 59 secured to the housing by screws 61, the centrifugal device being movable as a unit by hand wheel 62 which is rotatable in the casing and has a threaded connection with frame 64 of the centrifugal mechanism.

In the operation of the regulator, assuming that the engine is running, engine manifold pressure will be transmitted to bellows 34 which will have a tendency to collapse as the manifold vacuum is increased and permit expansible bellows 36 to overcome the elasticity of bellows 34 and swing lever 32 in a clockwise direction to open relief valve 28. An increase in absolute manifold pressure or a reduction in manifold vacuum suction will have the opposite effect and tend to turn lever 32 in a counterclockwise direction about its upper pivotal point 51 to close valve 28. Bellows 36 which compensates for variations in atmospheric pressure, is sealed under vacuum and has its exterior surface exposed to atmospheric pressure; therefore, at high altitudes a reduction in atmospheric pressure will cause the bellows to expand and counteract the corresponding expansion of bellows 34. An increase in atmospheric pressure, such as is encountered at low altitudes, will have the reverse action and tend to collapse bellows 36 and counteract the corresponding contraction of bellows 36.

Closure of valve 28 interrupts the circulation through conduits 24 and 29 and causes a pressure to be built up in chamber 23 whereupon piston 22 and rod 21 are forced toward the left against the force of spring 23 to close the supercharger throttle 17 and reduce the supercharging action.

The operation of the regulator as above described is well known in the art but is not entirely satisfactory as no compensation is provided for controlling the supercharger action in accordance with the engine speed or other variables such as temperature, and in the present case means have been provided for varying the effect of bellows 34 and 36 in accordance with engine speed and other variables. In accordance with the above object of the invention, means have been provided for varying the effect of the expansive bellows by moving the upper end of the lever to rotate it about an axis passing through its mid-portion 33. It has been previously stated that weights 53 are rotated by the engine; therefore, as engine speed increases, weights 53 will move outwardly and move sleeve 51 toward the left to rotate lever 32 in a counterclockwise direction about its mid-point 33 to close valve 28 and cause piston 22 to move the supercharger throttle to a closed position. At reduced engine speeds weights 53 will be moved to their inner position by springs 52 and cause sleeve 51 to be moved toward the right to open relief valve 28 and allow spring 23 to move throttle valve 17 to the open position. Under normal operating conditions it is usually desired to maintain the speed of the engine at somewhere near 1200 R. P. M. which speed can be maintained by a suitable selection of bellows and parts of the centrifugal device. Minor adjustments may be obtained by rotation of the hand wheel 62, whereby the centrifugal device is bodily slidable on the guides 59 to rotate lever 32 about pivotal point 33. It may be noted that gear 56 is provided with a wide face whereby considerable movement may be obtained without causing it to be disengaged from its mating gear 57.

In the form of the invention shown in Fig. 3, additional means of compensation have been provided whereby the movement of lever 32 is also influenced by temperature. The means for providing the temperature control comprise a bulb 71 which is preferably inexpansible and containing a liquid having a boiling point of a value such that at a predetermined temperature the fluid will volatilize and transmit pressure through conduit 72 to the expansible bellows 73 which is secured to casing 39 at 74, and has its opposite end in contact with the slidable frame 64 of the centrifugal device. Frame 64 is urged toward the casing by spring 76 which has one end connected with the frame and the opposite end secured to the casing by the adjusting nut 77. In the operation of this form of the device, lever 32 is moved in accordance with engine pressure, atmospheric pressure, engine speed and temperature. Bulb 71 may be located at any convenient place near the engine, but it is preferably in close contact therewith whereby an increase of temperature causes bellows 73 to expand and thereby rotate lever 32 upon its pivotal point 33 to reduce the supercharging action.

In the form of the invention shown in Fig. 4, the centrifugal device has been omitted and the temperature responsive bellows 73 is directly connected to lever 32 by means of linkage 79 whereby lever 32 may be rotated about its pivotal point 33 by increases and decreases in temperature.

While certain embodiments of the invention have been illustrated and described, it is understood that the invention is illustrative only and is not limited to the form shown and described, or otherwise, except by the terms of the following claims.

What is claimed is:

1. In a regulator for an engine supercharger, a movable member for controlling the supercharger, power means for moving the member, a movable controller for controlling the power means, differential pressure actuated means for actuating the power means controller, and means driven by the engine coacting with the pressure actuated means to vary the effect thereof in a manner to reduce the supercharging action when the engine speed is increased.

2. In a regulator for an engine supercharger, a movable member for controlling the supercharger, differential pressure actuated means for controlling the movement of the member, and means driven by the engine coacting with the pressure actuated means to vary the effect thereof in a manner to reduce the supercharging action when the engine speed is increased.

3. In a regulator for an engine accessory, an actuating member for controlling the accessory, power means for moving the member, a lever for controlling the power means, said lever being movable about two spaced pivotal axes, means for moving one of said axes by the differential in pressure between engine and atmospheric pressures, means actuated in accordance with absolute atmospheric pressure for controlling the first mentioned means, and means for moving the other axis in accordance with engine speed.

4. In a regulator for an engine accessory, an actuating member for controlling the accessory, power means for moving the member, a lever for controlling the power means, said lever being movable about two spaced pivotal axes, means for moving one of said axes by the differential in pressure between engine and atmospheric pressures, and centrifugal means for moving the other axis in accordance with engine speed.

5. In a regulator for an engine accessory, an actuating member for controlling the accessory, power means for moving the member, a lever for controlling the power means, said lever being movable about two spaced pivotal axes, means for moving one of said axes by the differential in pressure between engine and atmospheric pressures, and centrifugal means for moving the other axis in accordance with engine speed, said centrifugal means being manually movable as a unit to adjust the regulator.

6. In a regulator for an engine supercharger, a fluid pressure actuated member for controlling the supercharger, means including a lever for controlling the fluid pressure to the member, an expansible device contacting said lever for moving the same, a second expansible device contacting said lever for moving the same, one of said devices being sealed under vacuum and having its exterior exposed to atmospheric pressure, the other of said devices being connected to the engine in a manner to be expanded and contracted in accordance with engine pressure, and a centrifugal device contacting the lever for moving the same in accordance with engine speed.

7. In a regulator for an engine supercharger, a fluid pressure actuated member for controlling the supercharger, means including a lever for controlling the fluid pressure to the member, an expansible device contacting said lever for moving the same, a second expansible device contacting said lever for moving the same, one of said devices being sealed under vacuum and having its exterior exposed to atmospheric pressure, the other of said devices being connected to the engine in a manner to be expanded and contracted in accordance with engine pressure, and a centrifugal device contacting the lever for moving the same in accordance with engine speed, said centrifugal device being arranged to reduce the supercharging action when the engine speed is increased.

8. In a regulator for an engine supercharger, a fluid pressure actuated member for controlling the supercharger, means including a lever for controlling the fluid pressure to the member, an expansible device contacting said lever for moving the same, a second expansible device contacting said lever for moving the same, one of said devices being sealed under vacuum and having its exterior exposed to atmospheric pressure, the other of said devices being connected to the engine in a manner to be expanded and contracted in accordance with engine pressure, a centrifugal device contacting the lever for moving the same in accordance with engine speed, said centrifugal device being bodily movable, and manually operable means for moving the centrifugal device to adjust the regulator.

9. In a regulator for an engine supercharger having an inlet conduit and a throttle therein, an actuating member connected to the throttle, fluid pressure means for moving the member to close the throttle, a control for the fluid pressure means including a lever, means for moving the member to open the throttle, means for moving said lever in accordance with the differential between engine and atmospheric pressures, and means for moving said lever in accordance with engine speed.

10. In a regulator for an engine supercharger having an inlet conduit and a throttle therein, an actuating member connected to the throttle, fluid pressure means for moving the member to close the throttle, a control for the fluid pressure means including a lever, means for moving the member to open the throttle, means for moving said lever in accordance with the differential between engine and atmospheric pressures, an engine driven centrifugal device for moving said lever in accordance with engine speed, and said device being arranged to move the lever to close the throttle when the engine speed is increased.

11. In a regulator for an engine supercharger having an inlet conduit and a throttle therein, an actuating member connected to the throttle, fluid pressure means for moving the member to close the throttle, a control for the fluid pressure means including a lever, means for moving the member to open the throttle, means for moving said lever in accordance with the differential between engine and atmospheric pressures, a bodily movable engine driven centrifugal device for moving said lever in accordance with engine speed, and manually operable means for moving the device as a unit to adjust the regulator.

12. In a regulator for an engine accessory, an actuating member for controlling the accessory, power means for moving the member, means for controlling the power means including a lever, expansible means for moving the lever in accordance with the differential between engine and atmospheric pressures, a centrifugal device for moving the lever in accordance with engine speed, and an expansible device for bodily moving the device in accordance with temperature to vary the position of the lever.

13. In a regulator for an engine supercharger, an actuating member for controlling the supercharger, power means for moving the member, means for controlling the power means including a lever, expansible means for moving the lever in accordance with the differential between supercharger and atmospheric pressures, a centrifugal device for moving the lever in accordance with engine speed, an expansible device for bodily moving the device in accordance with temperature to vary the position of the lever, resilient means for compressing the expansible means, and means for varying the compressive force exerted by the resilient means.

14. In a regulator for an engine accessory, a servo-motor for controlling the accessory, a control for the servo-motor including a lever, said lever being oscillatable about two spaced axes, means for moving one axis in accordance with the differential between engine and atmospheric pressures, and means for moving the other axis in accordance with engine speed and temperature.

15. In a regulator for an engine accessory, a servo-motor for controlling the accessory, a control for the servo-motor including a lever, said lever being oscillatable about two spaced axes, means for moving one axis in accordance with the differential between engine and atmospheric pressures, means for moving the other axis in accordance with engine speed and temperature, and a manually adjustable spring associated with the speed and temperature means for moving the last named axis to adjust the regulator.

16. In a regulator for an engine supercharger, an actuating member for controlling the supercharger, power means for moving the member, expansible means for controlling the power means in accordance with the differential between supercharger pressure and atmospheric pressure, an expansible bellows sealed under a predetermined pressure and exposed to atmospheric pressure, said bellows being arranged to oppose expansion of the expansible means upon an expansion of the bellows, an engine driven centrifugal device for controlling the expansible means and the bellows, said device being arranged to control the action of the bellows and expansible means both by variations in the speed of the device and by bodily movement thereof, and manually operable means for bodily moving the centrifugal device to adjust the regulator.

17. In a regulator for an engine supercharger, an actuating member for controlling the supercharger, power means for moving the member, an expansible bellows for controlling the power means in accordance with the differential between supercharger and atmospheric pressures, an expansible bellows for controlling the power means in accordance with the differential between atmospheric pressure and a predetermined constant pressure, said expansible bellows being arranged in opposed relation to each other whereby expansion of one bellows tends to collapse the other bellows, and temperature responsive means for controlling the power means in accordance with temperature.

DAVID GREGG.